(12) United States Patent
Boise

(10) Patent No.: US 8,514,097 B2
(45) Date of Patent: Aug. 20, 2013

(54) GLASSES WITH SOUND ACTIVATED LIGHTS

(76) Inventor: Michael William Boise, Las Vegas, NV (US)

( * ) Notice: Subject to any disclaimer, the term of this patent is extended or adjusted under 35 U.S.C. 154(b) by 74 days.

(21) Appl. No.: 12/845,140

(22) Filed: Jul. 28, 2010

(65) Prior Publication Data

US 2011/0037606 A1  Feb. 17, 2011

Related U.S. Application Data

(60) Provisional application No. 61/234,157, filed on Aug. 14, 2009.

(51) Int. Cl.
*G08B 5/22* (2006.01)
(52) U.S. Cl.
USPC ........................................ 340/815.45; 706/12
(58) Field of Classification Search
USPC ..... 340/815.45; 706/12; 362/103; 351/158, 351/48; 365/103; 662/103
See application file for complete search history.

(56) References Cited

U.S. PATENT DOCUMENTS

| 5,710,614 | A | * | 1/1998 | Cereda | 351/48 |
| 2007/0136218 | A1 | * | 6/2007 | Bauer et al. | 706/12 |
| 2008/0089056 | A1 | * | 4/2008 | Grosjean | 362/103 |
| 2008/0151179 | A1 | * | 6/2008 | Howell et al. | 351/158 |

* cited by examiner

*Primary Examiner* — Shirley Lu
(74) *Attorney, Agent, or Firm* — Rosenberg, Klein & Lee

(57) ABSTRACT

Glasses having a sound activated lighting system provide an engaging and entertaining display that is also interactive. The lighting system may activate one or more lights based on the loudness or other characteristic of a sound. The glasses may comprise a frame configured to support the lighting system. The lighting system may include a power source, one or more lights, a microphone, and a controller. The controller may receive sound input from the microphone and activate or deactivate a light based on the loudness or other characteristic of the sound input.

5 Claims, 1 Drawing Sheet

GLASSES WITH SOUND ACTIVATED LIGHTS

CROSS-REFERENCES TO RELATED APPLICATION

This application claims priority to U.S. Provisional Patent Application No. 61/234,157, filed Aug. 14, 2009.

BACKGROUND OF THE INVENTION

1. Field of the Invention

The invention relates generally to wearable accessories and particularly to eyewear, such as sunglasses, having sound activated lighting.

2. Related Art

People everywhere, particularly but not limited to party and concertgoers appreciate the novelty, experience, and amusement that comes from being entertained. At concerts, parties, and other social events, individuals may be entertained by music, conversations with others, or other human interaction.

People place great value in being able to interact or participate in the entertainment. Participation adds to the energy of the underlying entertainment at a social event, which can often be felt by others in attendance. For instance, it is often said that music at a concert or party is much better than listening to a recording in other circumstances.

Traditionally, people have used themselves or things on hand to interact and participate in social events. From the discussion that follows, it will become apparent that the present invention addresses the deficiencies associated with the prior art while providing numerous additional advantages and benefits not contemplated or possible with prior art constructions.

SUMMARY OF THE INVENTION

Glasses with a sound activated lighting system are disclosed herein. The lighting system provides an entertaining and engaging display to the wearer or user of the glasses as well as those around the user. The glasses and lighting system may be configured in various ways.

For example, in one embodiment the lighting system may comprise one or more lights mounted to a glasses frame, a microphone configured to capture sound mounted to the frame, a controller configured to receive input from the microphone and to activate and deactivate the one or more lights based on one or more characteristics of the sound, a power source (e.g. battery, solar panel, etc. . . . ) mounted within a compartment of the frame configured to provide power to the one or more lights, and a switch configured to turn on and turn off the lighting system.

The lights may emit light of one or more colors when activated. The switch may be movable between a plurality of positions to adjust the sensitivity of the microphone. It is noted that the microphone may be at a front portion of the frame, at a temple, or both. Lights may be mounted to the front portion and the temples.

The controller may be configured to operate in various ways. For example, the controller may activate the lights based on a loudness of the sound. The controller may activate at least one but not all of the lights based on one or more characteristics of the sound. It is contemplated that a wireless communications device may be coupled with the controller. The wireless communications device may be configured to receive one or more signals which the controller may use to activate and deactivate the one or more lights.

In another example embodiment, a pair of glasses may be provided. The glasses may comprise a frame comprising a front frame and one or more temples, a microphone configured to capture sound, one or more lights mounted to the front frame and one or more temples, a controller configured to receive input from the microphone and to activate and deactivate the one or more lights based on one or more characteristics of the sound, and a power source configured to power the one or more lights. The controller may be configured to activate and deactivate the one or more lights based on a comparison of a loudness of the sound to one or more loudness thresholds.

The glasses may include other elements. For example, the glasses may have one or more tinted, mirrored, or non-tinted lenses supported by the front frame. In addition, a dial switch may be included. The dial switch may be attached to the frame and movable between a plurality of positions to alter the sensitivity of the controller to the sound. An additional microphone may be provided. The microphone and the additional microphone may be used to capture sound at different locations on the frame. The controller may receive input from both the microphone and the additional microphone.

In another example embodiment, a method for lighting a pair of glasses may be provided. The method may comprise mounting one or more lights to a frame of the glasses where the frame comprises a front frame and one or more temples. At least one microphone configured to capture sound may be mounted on the frame as well. A controller may be provided to receive input from the microphone and to activate or deactivate the lights based on one or more characteristics of the sound. Also, a switch may be provided to adjust the sound sensitivity of the controller. The switch may be moved from a first position to a second position to adjust the sound sensitivity of the controller, or to turn on the controller. A power source may be coupled to the controller and one or more lights to energize these components.

The method may also include receiving the sound at the pair of glasses. In addition, the method may include determining a loudness of the sound and activating the one or more lights based on the loudness of the sound.

It is noted that a wireless communications device may be mounted to the frame. One or more signals may be received at the wireless communications device. The controller may then activate and deactivate the lights based on the signals.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
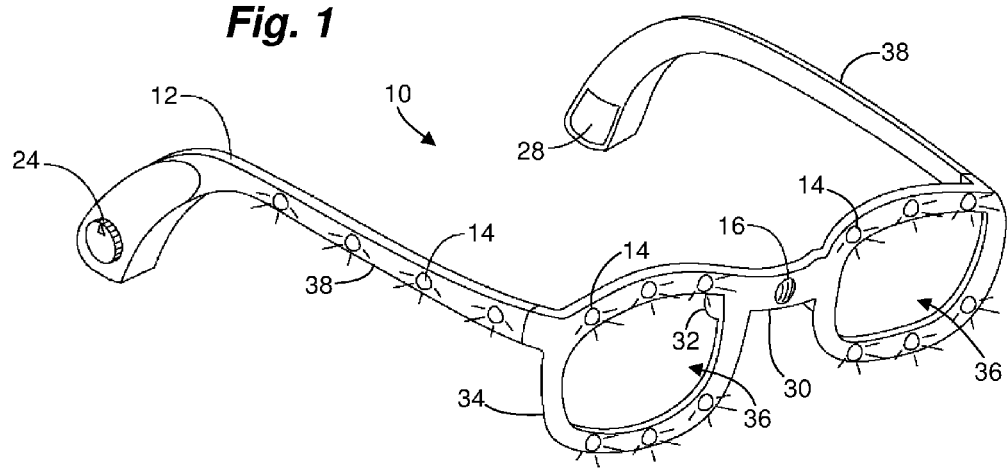
FIG. 1 shows a perspective view of an embodiment of the present invention.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Glasses having a sound activated lighting system are disclosed herein. One exemplary embodiment of the present invention includes a pair of glasses comprising a frame supporting or housing one or more lights, one or more microphones, an integrated circuit chip, and a power supply. The lights may react to sound levels that are captured through the microphone and converted or otherwise used by the integrated circuit chip to signal the lights causing them to light up in synchronization with the sound. The power supply may comprise one or more batteries or any other source of power including power generated by motion of the glasses when worn.

The sound activated lighting system of the glasses provides entertainment through visual effects that people may find pleasant and relaxing. The visual effects may also enhance enjoyment of music for anyone within viewing range of the glasses. In addition, the sound activated lighting may provide an exciting display for some people. For instance, at a concert or party with music, the lighting system may react to beats, rhythms, or other characteristics of the music. At social events without such music, the lighting system may react to various sounds. For instance, the lighting system may react to noises, the sound of a conversation, and other audible events.

People interacting with someone wearing the glasses can directly experience the entertaining effect of the lighting system. For example, one or more lights of the glasses may illuminate based on vocalizations or other sounds a person is making during a conversation with the person wearing the glasses. Others also experience the entertaining effect of the lighting system. For example, one or more people wearing the glasses may be in another part of a room or other venue, but yet are in the field of view of other people. Though these people may not be talking to or interacting directly with people wearing the glasses, the lights can be seen and, may add to the entertainment at a social event.

A person wearing the glasses may receive a great deal of attention. This may be highly desirable. For example, the glasses may be a great conversation starter and attention getter at a social event. The fact that the lighting system of the glasses reacts to sound near the wearer increases the interest others may have in the glasses. In addition, the reactivity to sound adds to the entertainment provided by the glasses.

The glasses may be useful in everyday life as well. For example, the glasses may assist hearing-impaired or deaf people to detect sounds around them that they would otherwise be unaware of, especially during an emergency. To illustrate, a deaf person would be able to detect their phone ringing, a car beeping the horn behind them, someone talking to them out of their sight, and the like.

There are traditional glasses that light up or produce light output. However, traditional light-up glasses flash constantly with no intelligence. These traditional glasses don't blink or operate their lights according to sound or any other input. In contrast, the glasses herein improve upon traditional glasses by providing lights that react to sound levels captured through a microphone and converted on an integrated circuit (IC) chip. The chip may then send a signal to the lights to cause them to light up in synchronization with the sound.

Various embodiments of the glasses will now be described with regard to FIG. 1. Though described herein as glasses, it is noted that the "glasses" may be configured as various types of eyewear. For example, goggles could be provided with sound activated lighting in one or more embodiments. Also, any type of glasses may be used. For example, the glasses may be prescription glasses, sunglasses, prescription sunglasses, 3D glasses, reading glasses, novelty glasses, costume glasses, safety glasses or the like. Accordingly, the glasses may include a variety of one or more prescription, non-prescription, magnifying, polarizing, reflective, tinted, colored, clear, ultraviolet protected or other lenses. In addition, the frames of the glasses may have a variety of shapes. It is contemplated that the sound activated lighting system may be used with other wearable accessories, such as headbands and visors for example. It is contemplated that the microphone, glasses, controller and power source may be configured as an after market kit that attaches to a pre-existing pair of glasses. This kit may then attach and un-attach to the user's favorite pair of glasses when desired and be removed when not in use.

FIG. 1 is a perspective view of exemplary glasses 10 having sound activated lighting. As can be seen, in one or more embodiments, the glasses 10 may comprise a frame 12 configured to support various components of the glasses. For example, the frame 12 may support one or more lenses, or no lenses in the case of some novelty glasses. Alternatively, if other types of eyewear are used, the frame 12 may be configured to support different types of lenses. For example, the frame 12 may be configured to support lenses for goggles.

In one or more embodiments, the frame 12 may have various portions or elements. For example, as shown, the frame 12 comprises a front frame 34 which provides an opening to support one or more lenses 36. The front frame 34 may also support one or more lights 14. The front frame 34 may comprise a bridge 30 used to connect sections of the front frame 34, such as the sections which support lenses 36. One or more nose pads 32 may be at or near the bridge 30 to hold the front frame 34 at a position above a user's nose when worn. The front frame 34 may be provided in various shapes.

The frame 12 may also comprise one or more temples 38 extending from the front frame 34. As can be seen, the temples 38 may be elongated members having a curve, bend, or the like to accept the user's ear when worn. This helps keep the glasses secured to the user. It is contemplated that the temples 38 may be straight in some embodiments. The temples 38 may be rigidly mounted to the front frame 34. Alternatively, the temples 38 may be pivotally mounted. For example, the temples 38 may be mounted to the front frame 34 via a pivot or hinge structure. This allows the temples 38 to be folded, such as to allow the glasses to be stored in a relatively smaller container. The pivot mount of the temples 38 may also be used to allow the temples to better fit around a user's head.

Figure 2:
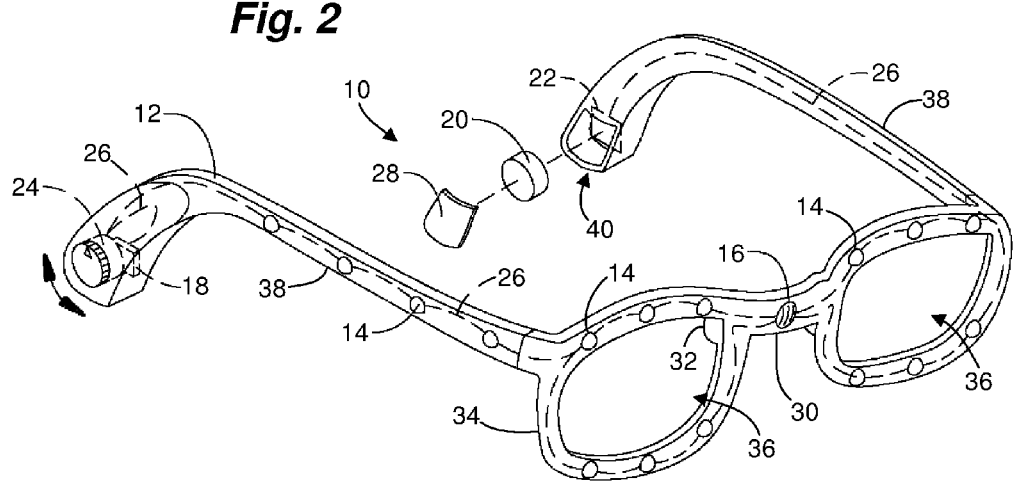
FIG. 2 shows an exploded view of an embodiment of the present invention.

The frame 12 may also support a sound activated lighting system, which will now be described with reference to FIG. 2. FIG. 2 illustrates exemplary glasses 10 having a transparent frame to allow internal structures and components to be seen. As can be seen, the frame 12 may provide a support structure for one or more lights 14, microphones 16, control circuitry (such as a controller 18), power sources (such as one or more batteries 20), or various combinations thereof. The components may be connected by one or more wires 26. It is contemplated that the size of the components could be minimized to provide a sleeker appearance in some embodiments.

The lights 14 may be a variety of light emitting devices. For example, a light 14 may be an LED, light bulb, or other light source. The lights 14 may have associated elements in some embodiments. For example, one or more fiber optic cables (or other transparent conduit for guiding light) may be used to guide light from a light source to a portion of the frame 12. In this manner, a single light source may emit light at various points on the frame 12. The lights 14 may be controlled by control circuitry, such as a controller 18. The controller 18 may control activation, deactivation, brightness, and/or color of the lights 14 as well as other characteristics of light generated by the lights 14. The controller 18 may be an integrated circuit, or other circuitry configured to control the lights 14 as described herein. The controller 18 may provide power or other output to the lights 14 via one or more wires 26.

One or more microphones 16 may be used to collect or capture sound input. Sound captured or detected by the microphone is converted to a sound signal, which may comprises an electrical signal. The captured sound may be sent to the controller 18, such as through one or more wires 26. The controller 18 may then control the lights 14 based on one or more characteristics of the sound. For instance, sound level from 0 dB to about 250 dB may be recorded by the microphone 16. Other sensitivity ranges may be used as well. The controller 18 may use this information to control the activation and/or brightness of one or more lights 14. In one embodiment, the sound may be converted into signals at the controller 18. This may be used to trigger the lights 14 to illuminate.

Figure 3:
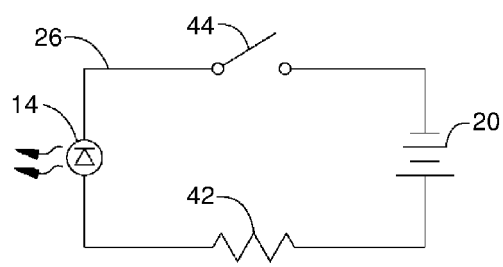
FIG. 3 shows a schematic wiring diagram of an embodiment of the present invention.

A basic exemplary circuit diagram showing how a battery 20 may be connected to a light 14 is shown in FIG. 3. As can be seen, one or more resistors 42 may be used to alter or control the electricity provided to the light 14. A switch 44 may be used to complete the circuit, providing electricity to activate the light. The switch 44 may also be used to break the circuit, thus deactivating the light. Typically, the switch 44 will be automated so as to allow a light to be activated based on sounds detected by the glasses. The resistance, such as provided by one or more resistors 42, may be adjustable as well to alter the power and thus brightness of the light 14.

Switching and adjustment of power level may be conducted in an automated fashion by a controller 18 as described above. In one embodiment, controller 18 may comprise one or more switches 44, one or more resistors 42, both, or analogous components to perform its function.

Referring back to FIG. 2, one or more thresholds may be used to determine when or how brightly a light 14 is lit. For example, a sound level of a particular level may cause a light 14 to be activated. Below that threshold, the light 14 may remain deactivated. In this manner, the light 14 may blink based on sound received by the glasses. In another example, the sound level may determine how many or which lights 14 are activated. In addition, the sound level may determine how brightly a light 14 is lit. For example, louder sounds may cause more lights to be lit than softer sounds, or vice versa. Likewise, louder sounds may cause a light 14 to be more brightly lit than softer sounds, or vice versa.

It is noted that the threshold may be a particular sound level, as in the above example, or may be a range of levels. The threshold may be preset or may be adjustable in one or more embodiments. In addition, multiple thresholds may be provided, with each threshold triggering different light activations. For example, sound within a particular threshold may activate one or more lights 14, while sound within another threshold activates one or more other lights.

Other characteristics of sound may also trigger activation of the lights 14. For example, the controller 18 may be configured to recognize or detect particular noises, pitches of sound, particular sounds, or the like. It is contemplated that in some embodiments, the controller 18 may recognize certain words or speech. Upon such recognition, the controller 18 may activate one or more lights 14.

The activation and deactivation of lights 14 in these ways (alone or in combination) is highly engaging and entertaining. As stated, a user and people around the user may directly see the result of sounds they are making or sounds around them in the lights 14 of the glasses 12. Unlike, traditional glasses which merely flash in a preset manner, the lights 14 and lighting system herein are interactive in that the lights are activated based on surrounding music, conversations, noise, and other sound.

The dial switch 24 may be used to turn on or off the glasses in one or more embodiments. In one embodiment, a dial switch 24 may be provided to activate the sound capturing function of the device, such as a microphone 16. An IC chip or a different type of chip could be used for same purpose. Once the dial switch 24 is activated, the microphone 16 may capture sound level from between about 0 dB to about 250 dB. The sound sensitivity range may vary in different embodiments. For example, the glasses may be configured to be sensitive to a smaller range of sound in some embodiments.

The dial switch 24 may also be used to alter the lighting system's sensitivity to sound. Thus, once the dial switch 24 is activated to desired sensitivity, the lights 14 may illuminate according to the surrounding music, sound, and the like. The dial switch 24 may be rotatable in one or more embodiments, to adjust the sensitivity. It is noted that other types of switches may be used as well. For example, a sliding switch or a selector switch with predefined positions could be used to adjust sensitivity. The controller 18 may allow sensitivity adjustment in some embodiments. For example, the controller 18 may accept user input from one or more buttons or the like to increase or decrease sensitivity. It is contemplated that the dial switch 24 may be digital or analog.

In general, altering the sensitivity of the lighting system changes when and/or how lights 14 are lit in response to particular sounds. For example, a high sensitivity may cause lights 14 to be activated at lower volumes while a lower sensitivity may require louder volume sound to activate a light. To achieve the desired sensitivity, a user may rotate or otherwise manipulate the dial switch 24 or other switch until the lights 14 of the glasses activate when the user desires. For example, in quiet environments the user may increase sensitivity to increase the occurrence of light activation. In loud environments the user may decrease sensitivity to prevent the lights 14 from being activated too often. It is noted that decreasing sensitivity to its minimum may cause the lighting system to turn off in one or more embodiments.

The dial switch 24 may be connected to the controller 18, such as shown in FIG. 2. In this manner, the controller may receive input indicating the desired sound sensitivity from the dial switch 24. For example, the dial switch 24 may adjust one or more thresholds for light activation that are used by the controller. It is contemplated that the dial switch 24 may also or alternatively be connected to the microphone 16 to alter the sensitivity of the microphone or the level of sound output from the microphone to the controller 18.

A power source contained within a power source receptacle may be used to power the lighting system. In general, a power source may be any device that provides electrical power to power the lighting system. For example, the power source may be a capacitor, battery 20, or solar panel. The power source may be connected to the controller 18 and/or other components of the lighting system by one or more wires 26. The power source could be substituted with stored solar power. In embodiments with multiple power sources, the power sources may be different to provide various ways of powering the lighting system (e.g., solar and battery power). In addition, one power source could be used to charge another (e.g., solar powered battery or capacitor recharging).

It is contemplated that the glasses 10 may include a communication system in one or more embodiments to permit one or two-way communication between the glasses 10 and one or more other devices, including other glasses. In one embodiment, a network card or the like could be added to the glasses 10 in order to activate them via wireless technology.

Communications capability allows additional functionality to be provided. For instance, the activation of lights 14 could be synchronized by an external control device. Alternatively, one pair of glasses 10 (or multiple glasses) could serve as a "control" unit that control activation of the lights 14 on one or more "slave" glasses. In this manner, sound received at the control glasses 10 causes synchronized illumination of lights 14, which creates a highly engaging display.

FIGS. 1-2 also illustrate where lighting system components may be mounted to a frame 12. To illustrate, as shown, the front frame 34 forms a support structure to which one or more lights 14 and a microphone 16 may be mounted. The microphone 16 may be mounted to a bridge 30 of the front frame 34. In this position, the microphone 16 may be centrally located and well positioned to receive sounds from sources in front of an around the user. For example, the microphone 16 may receive sounds from the direction in which the user is facing, such as sounds from a conversation or music.

The temples 38 may support one or more lights 14 in addition to or instead of any lights on the front frame 34. In addition, the temples 38 provide support for other components of the lighting system. For example, one or more temples 38 may support a dial switch 24 and battery compartment 40 having a battery cover 28.

Though illustrated as mounted to or supported by particular portions or elements of the frame 12, it is contemplated that various components of the lighting system may be positioned at any suitable location of the frame. For example, the dial switch 24, battery 20, or controller 18 could be mounted on the front frame 34 or at another location of a temple 38. The battery 20 and controller 18 could be placed in the upper part of the temple 38 in one embodiment.

Likewise, lights 14 could be arranged on the frame 12, removed, or added to create a more desirable lighting effect. Lights 14 may only be on the front frame 34 or only on one or more temples 38 in some embodiments. In addition, the lights 14 could be closely spaced or spaced further apart.

As another example, rather than being at the bridge 30, the microphone 16 may be at the left or right portions or sides of the front frame 34 or at one of the temples 38. It is noted that the frame 12 may support multiple microphones 16 in one or more embodiments. For example, a left microphone and right microphone may be at the left and right sides or portions of the front frame 34, respectively. One or more microphones 16 may also or alternatively be supported by a temple 38. For example, a microphone 16 may be located anywhere along the length of a temple 38. The microphone 16 may be positioned near the user's ear, such as to receive the same or similar sounds as the user's ear. A left microphone and right microphone may be at the left and right temples 38 in one or more embodiments. The use of multiple microphones 16 may allow additional sound to be captured. For instance, on the temples 38 the microphones 16 may capture stereo sound similar to that received by the user's ears.

Though shown as being mounted from an outer peripheral surface of the frame, it is contemplated that a microphone 16 may be mounted at various other surfaces. For example, a microphone 16 may be at a top or bottom surface of the frame 12. In these embodiments, the microphone 16 may respectively face upward or downward (when the glasses are worn).

This positioning may conceal the microphone 16 and protect the microphone from exposure to harmful elements, such as moisture, dust, and dirt. A microphone 16 may be positioned at an inner peripheral surface as well. For example a microphone 16 may be at the back of the front frame 34. In this position, the microphone 16 may be well positioned to receive sounds from its wearer thus allowing the lighting system to react primarily to the wearer's sounds.

It is noted that the area of the frame 12 at which a microphone 16 is mounted may comprise one or more openings to allow sound to pass through the frame to the microphone. Alternatively, the microphone 16 may be mounted external to the frame 12.

The frame 12 or portions thereof may be formed from various materials. For example, in one or more embodiments, plastic, metal, wood, rubber, composites, or a combination thereof may be used. The materials may be rigid, flexible, or in between. Also, the materials may have various colors or be coated with one or more colored coatings. Typically, the materials will provide a rigid structure to support the glasses and its components however, it is contemplated that the materials may be at least somewhat flexible such as to allow at least some flexibility to prevent the glasses from cracking or breaking.

In addition, the materials may be transparent, opaque, translucent, or semi-transparent. As stated, FIG. 2 illustrates an exploded view of glasses 10 having a transparent frame 12. It is noted that all or portion(s) of the glasses 10 may be made transparent. For example, one or more temples 38, the front frame 34, various portions thereof, or a combination thereof could be made transparent (or translucent). This is beneficial in that it allows lights to be internally mounted within the frame 12 and their light to be visible outside of the frame. In this manner, the lights are protected while remaining visible.

Likewise, it is contemplated that all or portion(s) of the frame 12 may be opaque in some embodiments. Lights may be mounted such that they extend outside the frame 12. In this manner, the light emitted by the lights may be visible in embodiments having an opaque frame 12 or opaque portion (s). It is contemplated that opaque portion(s) may be located to block at least some of the light from a wearer's view in some embodiments. In this way, the wearer of the glasses 10 may avoid distraction by the lights. For example, the back half or a back portion of the front frame 34 may be opaque to block at least some of the light from the wearer of the glasses 10. In other embodiments, the lights may be positioned to emit light away from the user. Alternatively, the wearer may be exposed to the light if desired.

The transparent embodiment of FIG. 2 provides a view of the components of the glasses 10 that may be located within the frame 12 of the glasses. As can be seen, the frame 12 may comprise one or more hollow portions or compartments to store and/or support components therein. For example, one of the temples 38 in FIG. 2 has a battery compartment 40 to hold a battery 20. As another example, the other temple 38 in FIG. 2 has a compartment which accepts a dial switch 24. Another compartment or the same compartment may be configured to accept a controller 18. It is noted that compartments may also be provided to support or mount one or more lights 14, microphones 16, or both. One or more channels or pathways within the frame 12 may be present to allow wire 26 or other conductive material to be run through the frame to interconnect various components of the lighting system. Fiber optic cable or other light guiding material could also run through the frame 12.

Thus, as can be seen, a compartment is generally an open area or void in a portion of the frame 12 that accepts one or more components therein. To illustrate, in FIG. 2, the battery compartment 40 accepts a battery 20 that powers the lighting system. It is noted that the battery compartment 40 may include one or more electrical contacts 22 to transfer electricity from the battery 20 (or other power source). A battery cover 28 may be provided to secure the battery 20 while allowing the battery to be removed and replaced, such as when the battery is drained. Typically, at least two contacts 22 will be provided to connect to the positive and negative leads of a battery 20.

Compartments may fully enclose a component, such as shown in FIG. 2 with regard to the battery 20 and controller 18, or may enclose a portion of a component, such as shown by the dial switch 24, a portion of which remains externally accessible to a user. If compartments are used to mount one or more lights 14, a portion of the lights may be external to the frame to allow the lights to be visible. Alternatively, as stated, the frame 12 may have light transmissive portion(s). In such embodiments, the lights 14 may be fully enclosed (and protected) within the frame 12, such as within one or more compartments of the frame.

The frame 12 may be configured with enlarged areas to allow compartments of various sizes. For example, the end of a temple 38 where a battery compartment 40 is located may be flared outward to provide a volume suitable to store one or more batteries 20, one or more contacts 22, and any other associated components. As discussed above, the components of the lighting system may be positioned at various areas of a frame 12. Accordingly, any compartments used to store or mount such components may be located at various areas of a frame 12.

The glasses 10 can be made by utilizing a plastic mould to act as the housing then having electronics installed by machine and sealed up inside.

From the description herein, it can be seen that the glasses and sound activated lighting system may be used for entertainment purposes. In addition, the glasses create a pleasant visual effect in synchronization with surrounding music, sound, and the like. Also, deaf users can use the glasses to detect sound, which they would otherwise not be aware of. The glasses could be used in other situations where sound detection is desired. Also, the glasses could be used when lighting is desired so a person would shout or make a sound to activate it in order to see. For instance, during an emergency situation such as a blackout, a person will shout for help and the lights will trigger from the sound. Also, the glasses may enhance sexual pleasure by lighting up glasses according to sexual sound effects.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A lighting system integrated into glasses comprising:
   the glasses including a frame having a front frame and a pair of temples extending from the front frame;
   a plurality of lights mounted to at least the front frame of the glasses;
   a microphone mounted to the frame, the microphone being configured to capture and convert sound to an electrical sound signal;
   a controller disposed within the frame and coupled to the microphone and the plurality of lights, the controller being configured to receive the electrical sound signal from the microphone and to activate and deactivate the plurality of lights in a manner adjustably responsive to an intensity of the captured sound represented by the electrical sound signal;
   a power source mounted within a compartment of the frame, the power source being configured to provide power to the plurality of lights through the controller; and
   a switch mounted to the frame and coupled to the controller, the switch providing an input to the controller to adjustably select a sound intensity threshold, wherein the sound intensity threshold inversely corresponds to a sensitivity of the controller to the intensity of the captured sound represented by the electrical sound signal, where a higher selected sound intensity threshold corresponds to a lower sensitivity and thereby requires a greater intensity of the captured sound to activate the plurality of lights.

2. The lighting system of claim 1, further comprising a wireless communications device disposed within the frame and coupled with the controller, the wireless communications device being configured to transmit signals to at least one external lighting system and thereby provide a synchronized lighting effect.

3. A plurality of pairs of glasses each having a lighting system integrated therein, each of the plurality of pairs of glasses comprising:
   a frame comprising a front frame and a pair of temples extending from the front frame;
   at least one microphone mounted to the frame, the at least one microphone being configured to capture sound and output an electrical sound signal;
   a plurality of lights mounted to the front frame, the pair temples, or both;
   a controller disposed within the frame and coupled to the at least one microphone and the plurality of lights, the controller being configured to receive the electrical sound signal from the at least one microphone and to activate and deactivate the plurality of lights in a manner adjustably responsive to an intensity of the captured sound represented by the electrical sound signal;
   a power source configured to power the plurality of lights through the controller;
   a wireless communications device disposed within the frame and coupled to the controller, the wireless communications device being configured to transmit signals to at least at least a portion of other of the plurality of pairs of glasses and thereby provide a synchronized lighting effect; and
   a switch mounted to the frame and coupled to the controller, the switch providing an input to the controller to adjustably select a sound intensity threshold, wherein the sound intensity threshold inversely corresponds to a sensitivity of the controller to the intensity of the captured sound represented by the electrical sound signal, where a higher selected sound intensity threshold corresponds to a lower sensitivity and thereby requires a greater intensity of the captured sound to activate the plurality of lights.

4. The glasses of claim 3, wherein the at least one microphone is defined by a pair of microphones respectively disposed in the pair of temples and configured to capture sound in correspondence with sound received by a user's ears, whereby the controller receives input from the pair of microphones.

5. A method for integrating lights into a pair of glasses, comprising:

providing a pair of glasses having a front frame and a pair of temples extending from the frond frame;

providing a plurality lights mounted to the frame of the pair of glasses;

providing at least one microphone mounted to the frame of the pair of glasses to capture and convert sound to an electrical sound signal;

providing a controller mounted to the frame of the pair of glasses and electrically coupling the controller to the at least one microphone and the plurality of lights;

configuring the controller to activate and deactivate the plurality of lights in a manner adjustably responsive to an intensity of the captured sound represented by the electrical sound signal received from the at least one microphone;

providing a power source mounted to the frame of the pair of glasses;

connecting the power source to the controller and the plurality of lights to energize the plurality of lights responsive to activation thereof by the controller;

providing an adjustment switch mounted to the frame of the pair of glasses and connecting the adjustment switch to the controller; and setting a sound intensity threshold value with the adjustment switch, where the sound intensity threshold inversely corresponds to a sensitivity of the controller to the intensity of the captured sound represented by the electrical sound signal, where a higher selected sound intensity threshold corresponds to a lower sensitivity and thereby requires a greater intensity of the captured sound to activate the plurality of lights.

\* \* \* \* \*